(12) United States Patent
McCoy, Jr.

(10) Patent No.: US 12,089,604 B2
(45) Date of Patent: Sep. 17, 2024

(54) HINGED PLATE

(71) Applicant: LTA Distributing LLC, Millsboro, DE (US)

(72) Inventor: Donald Andrew McCoy, Jr., Millsboro, DE (US)

(73) Assignee: LTA Distributing, LLC, Millsboro, DE (US)

( * ) Notice: Subject to any disclaimer, the term of this patent is extended or adjusted under 35 U.S.C. 154(b) by 21 days.

(21) Appl. No.: 18/137,146

(22) Filed: Apr. 20, 2023

(65) Prior Publication Data

US 2023/0337689 A1    Oct. 26, 2023

Related U.S. Application Data

(60) Provisional application No. 63/333,108, filed on Apr. 20, 2022.

(51) Int. Cl.
*A22C 21/00* (2006.01)
*A22C 21/02* (2006.01)

(52) U.S. Cl.
CPC ................... *A22C 21/022* (2013.01)

(58) Field of Classification Search
CPC ..... A22C 21/022; A22C 21/02; A22C 21/028; A22C 21/06
USPC .......................... 452/82, 83, 71, 84
See application file for complete search history.

(56) References Cited

U.S. PATENT DOCUMENTS

| | | | |
|---|---|---|---|
| 5,711,703 A | 1/1998 | Peretz | |
| 6,343,406 B1 | 2/2002 | Yeh | |
| 7,121,941 B2 * | 10/2006 | Turner | A22C 21/022 452/88 |
| D562,669 S | 2/2008 | Kipperman | |
| 9,414,608 B1 * | 8/2016 | Goodyear, Jr. | A22C 21/022 |
| 10,202,791 B1 | 2/2019 | Jean et al. | |
| 10,785,988 B2 | 9/2020 | Batty, Jr. et al. | |
| 11,008,789 B2 | 5/2021 | Hatano | |
| D924,037 S | 7/2021 | Suh et al. | |
| D935,055 S | 11/2021 | Foley et al. | |
| 2006/0183415 A1 | 8/2006 | Turner | |
| 2016/0037789 A1 | 2/2016 | Goodyear, Jr. | |
| 2019/0320668 A1 | 10/2019 | Batty, Jr. et al. | |

(Continued)

FOREIGN PATENT DOCUMENTS

| | | |
|---|---|---|
| CN | 106819035 A | 6/2017 |
| JP | 2010-246451 A | 11/2010 |

OTHER PUBLICATIONS

Plate 10 Hole Finger by LTA, LTA Distributing, https://www.ltadistributing.com/parts/detail/66.html, retrieved Apr. 10, 2024 (Year: 2024).

(Continued)

*Primary Examiner* — Richard T Price, Jr.
(74) *Attorney, Agent, or Firm* — MILES & STOCKBRIDGE P.C.

(57) ABSTRACT

A poultry defeathering device, including a first plate having a first opening configured to be coupled to a driveshaft of a hub, a second plate having a plurality of second openings, each of the second openings configured to be coupled to a respective finger, and a hinge connecting the first plate and the second plate, and at least one standoff bushing that determines a distance between the first plate and the second plate when the hinge is in a closed position.

16 Claims, 15 Drawing Sheets

(56) References Cited

U.S. PATENT DOCUMENTS

2022/0125063 A1* 4/2022 McDonald .......... A22C 21/028
2022/0346392 A1* 11/2022 Batty, Jr .............. A22C 21/022

OTHER PUBLICATIONS

Notice of Allowance issued in corresponding U.S. Appl. No. 29/835,579 mailed Apr. 26, 2024.
International Search Report and Written Opinion mailed Aug. 7, 2023 in corresponding PCT Application No. PCT/IB2023/054054.

* cited by examiner

HINGED PLATE

PRIORITY INFORMATION

This application claims the benefit of the U.S. Provisional Patent Application No. 63/333,108 filed on Apr. 20, 2022, which is hereby incorporated by reference in its entirety.

FIELD OF THE INVENTION

The embodiments of the present invention generally relate to poultry defeathering devices and more particularly to devices that provide a more efficient way to replace rubber picking fingers inside the defeathering devices.

DISCUSSION OF THE RELATED ART

As discussed in U.S. Pat. No. 10,785,988, millions of tons of poultry are raised, processed, and brought to market yearly throughout the world. In 2016 for example, and in the United States alone, over 8.78 billion broiler chickens were produced and over 244 million turkeys were produced with a value in excess of $32 billion dollars. Poultry is processed in an efficient manner by shackling, stunning, bleeding, scalding, picking, eviscerating, washing, chilling, carving, and deboning.

Machines replaced workers plucking the feathers of poultry in poultry plants decades ago. Modern picking machines generally include a plurality of discs or drums onto which fingers are secured. Several discs are positioned along the sides of a path traversed by a chain/shackle carrying the poultry through the machine. The discs are rapidly rotated, ensuring that the fingers contact as much of the outer surface of each bird as possible. These fingers then "pick" the feathers off each poultry carcass as it passes through the machine via chain/shackle. Unfortunately, the fingers often crack, break or wear out at a significant rate due to the friction involved in the de-feathering process. This makes it necessary to replace thousands of fingers each month for each processing line.

A plurality of fingers are mounted to each disc or drum. Fingers are generally shaped having a larger base, a tapered body and a smaller diameter tip end. The tapered body is often ribbed, and most fingers include a groove located next to the base. Each disc has a plurality of openings large enough for the body of each finger to fit through, but small enough to abut the base diameter. Each finger is secured by pulling the finger through a hole and seating the hole within the finger groove. A typical picking line will include four defeathering machines. Each machine may have 640 or more fingers making each line use in excess of 2500 fingers to defeather poultry and each machine utilizes water sprays to continually wash feathers off both the fingers and the poultry as its processed.

In a typical configuration, there are 64 units (e.g., disks) per machine. The individual fingers get pulled through the holes and locked into a 10 hole finger plate (e.g., disk), the industry standard plate in the market. Each 10 hole finger plate is bolted to a respective drive shaft or hub of the defeathering machine. The machine typically includes 64 hubs (components that have a belt driven pulley that goes on the drive side of the hub and an extended shaft that comes out the front) which the 10 hole finger plate bolts to.

Various plucking fingers have been used for decades. In an example configuration, the holes of the 10 hole finger plate are 18 mm in diameter. A rubber picking finger is about 23.50 mm at it's widest point before it drops off into a 19.30 mm slot that locks the finger in place. Behind this groove is the head of the finger measuring almost 29 mm wide and 11 mm thick representing something like a bolt head. When replacing a finger, the user has to pull very hard to get the finger into the slot. In some instances, soap or other lubricants are used to lube up the finger(s) before pulling. To remove these fingers a person uses a knife to cut the finger into and around the slotted area to remove the finger.

Replacement of fingers in previous plucking machines is both difficult and time consuming. In some configurations, each finger must first be cut off by hand. This process is labor intensive and dangerous as it involves the use of a blade in a tight, awkward environment. A replacement finger is then inserted into the vacant opening and pulled, often with some form of plier and significant force, to seat the opening within a groove of the finger. Plucking machines utilizing a plurality of feather stripping fingers continue to be the favored method for defeathering poultry. Unfortunately, the current devices and designs continue to be lacking in efficient finger replacement.

U.S. Pat. No. 5,711,703 to Peretz discloses an apparatus for removing a rubber finger from a disc or rotational drum. The finger shank is inserted into the apparatus where a blade cuts the finger close to the annular recess. The base of the finger may then be simply pushed through the backside of the disc. The Peretz patent does not address the inherent difficulties of inserting new fingers into the disc, but rather is concerned with the removal of worn fingers.

U.S. Pat. No. 7,121,941 to Turner discloses a support disc and rubber finger structure that allows an operator to easily insert and remove plucking fingers from the support disc without the application of excessive force. In order to prevent unwanted movement of the finger within the hole, and possible dislodgement therefrom, a backing plate is provided to abut the rear of the support plate and hold the finger securely.

U.S. Pat. No. 10,785,988 to Batty et al. discloses a hub drive shaft that is secured to a finger plate and a compression plate. The finger plate includes a central aperture and an annular abutment ring operationally associated with the central aperture. An oversized base of each finger is compressed between the compression plate and the finger plate and a mounting bolt is secured on the finger plate within a threaded hole of the hub drive shaft.

As identified by the inventor, there is a continued need for a more efficient and less dangerous device to facilitate the removal and replacement of fingers within a defeathering device.

SUMMARY OF THE INVENTION

Accordingly, the embodiments of the present invention are directed to a hinged device that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the hinged device includes a poultry defeathering device, comprising a first plate having a first opening configured to be coupled to a hub, a second plate having a plurality of second openings, each of the second openings configured to be coupled to a respective rubber finger, a hinge connecting the first plate and the second plate, and at least one standoff bushing that determines a distance between the first plate and the second plate when the hinge is in a closed position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the embodiments of the present invention, examples of which are illustrated in the accompanying drawings. FIGS. 1-15 illustrate example embodiments of the present invention.

The embodiments of the present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each may also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
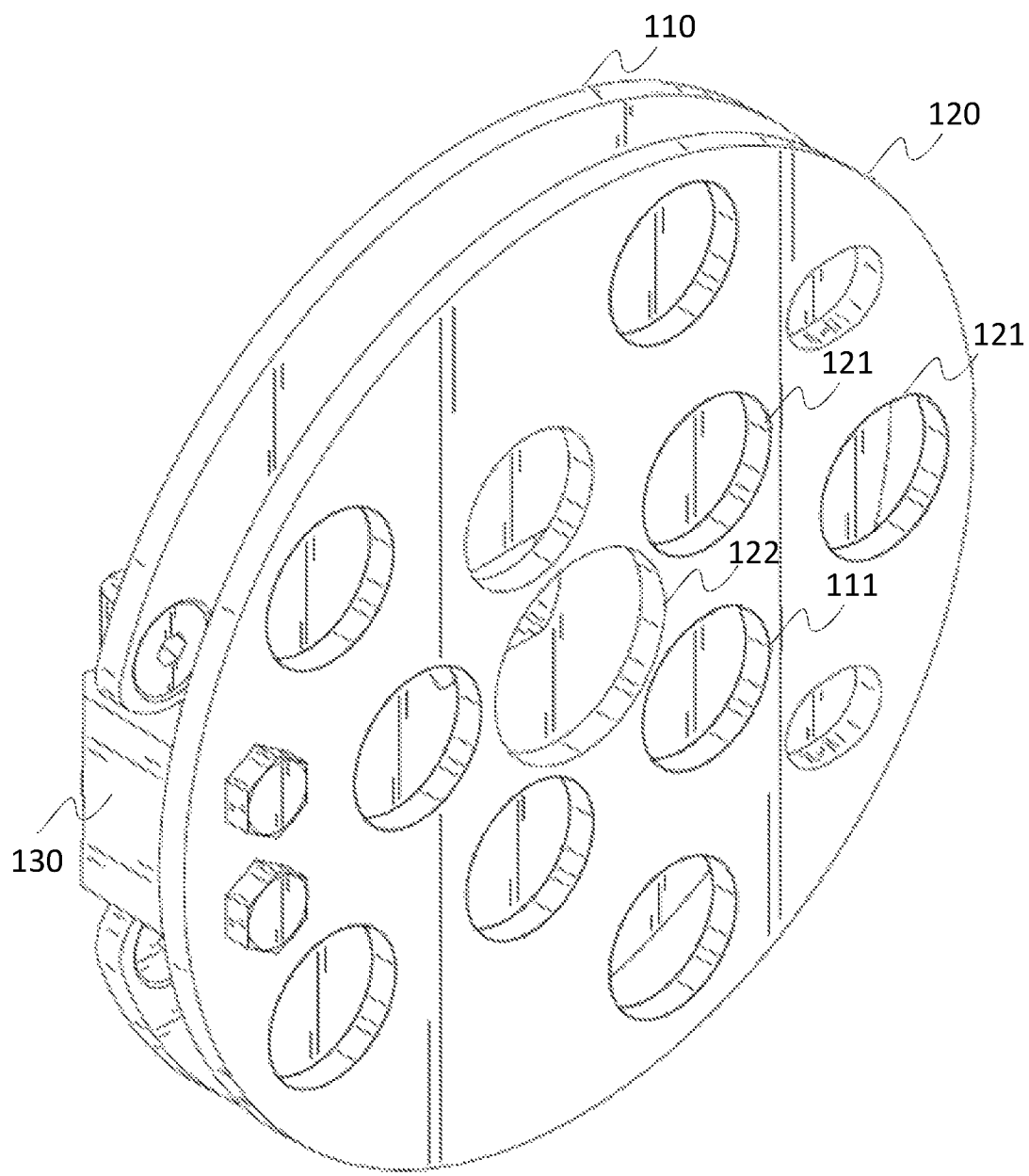
FIG. 1 is a perspective view of a hinged plate assembly according to a first example embodiment of the present invention.
Figure 2:
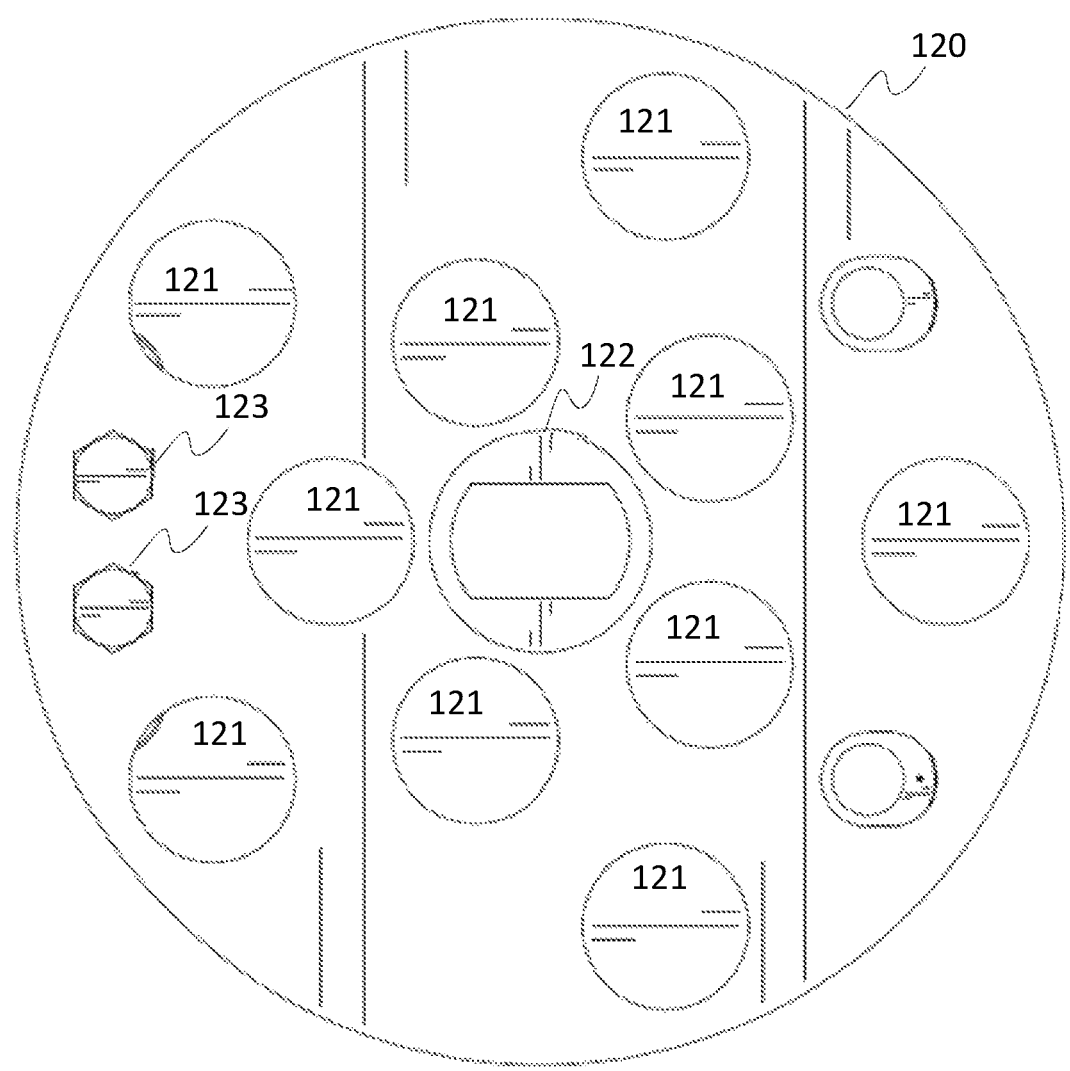
FIG. 2 is a front elevation view of the hinged plate assembly according to the first example embodiment of the present invention.
Figure 3:
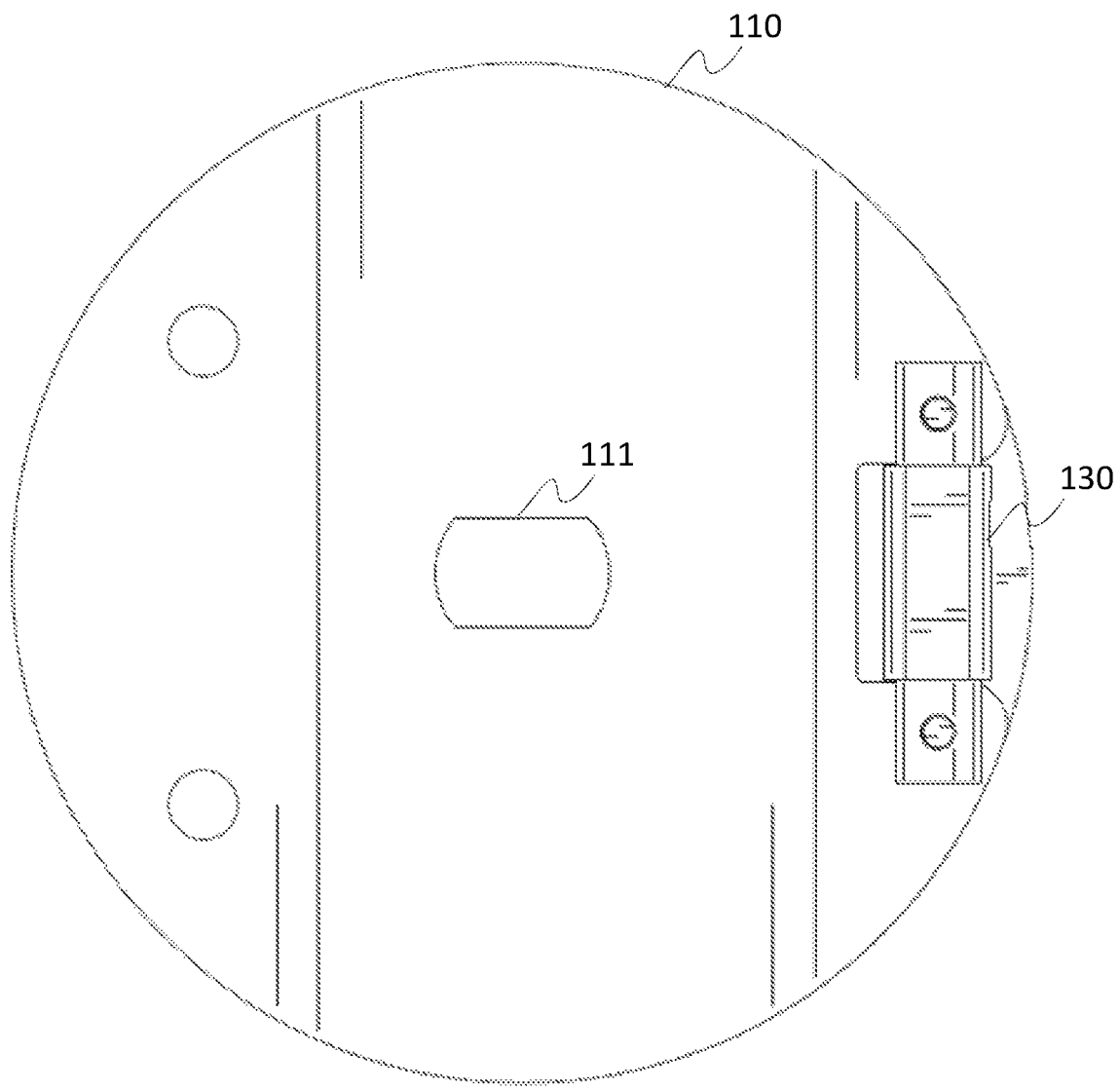
FIG. 3 is a rear elevation view of the hinged plate assembly according to the first example embodiment of the present invention.
Figure 4:
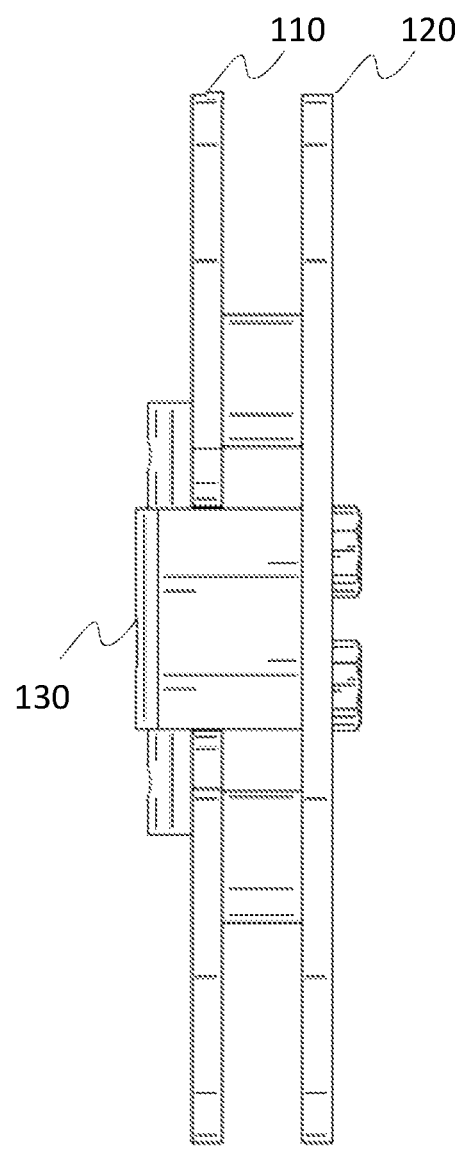
FIG. 4 is a left elevation view of the hinged plate assembly according to the first example embodiment of the present invention.
Figure 5:
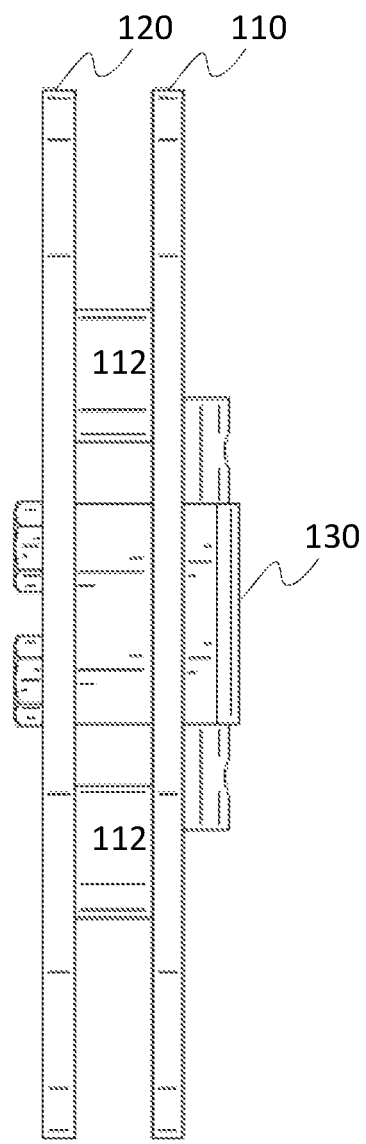
FIG. 5 is a right elevation view of the hinged plate assembly according to the first example embodiment of the present invention.
Figure 6:
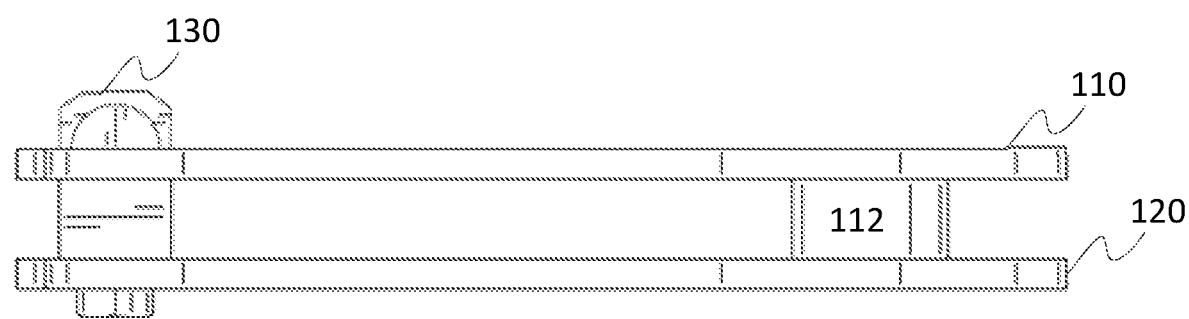
FIG. 6 is a top plan view of the hinged plate assembly according to the first example embodiment of the present invention.
Figure 7:
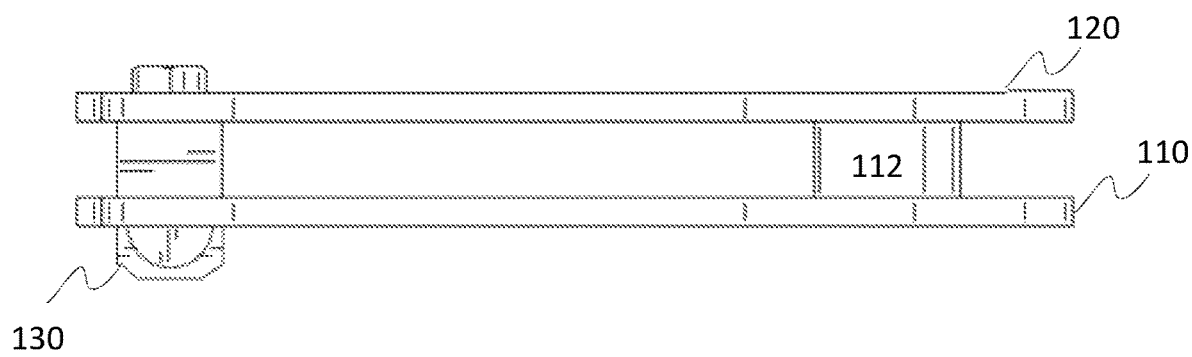
FIG. 7 is a bottom plan view of the hinged plate assembly according to the first example embodiment of the present invention.
Figure 8:
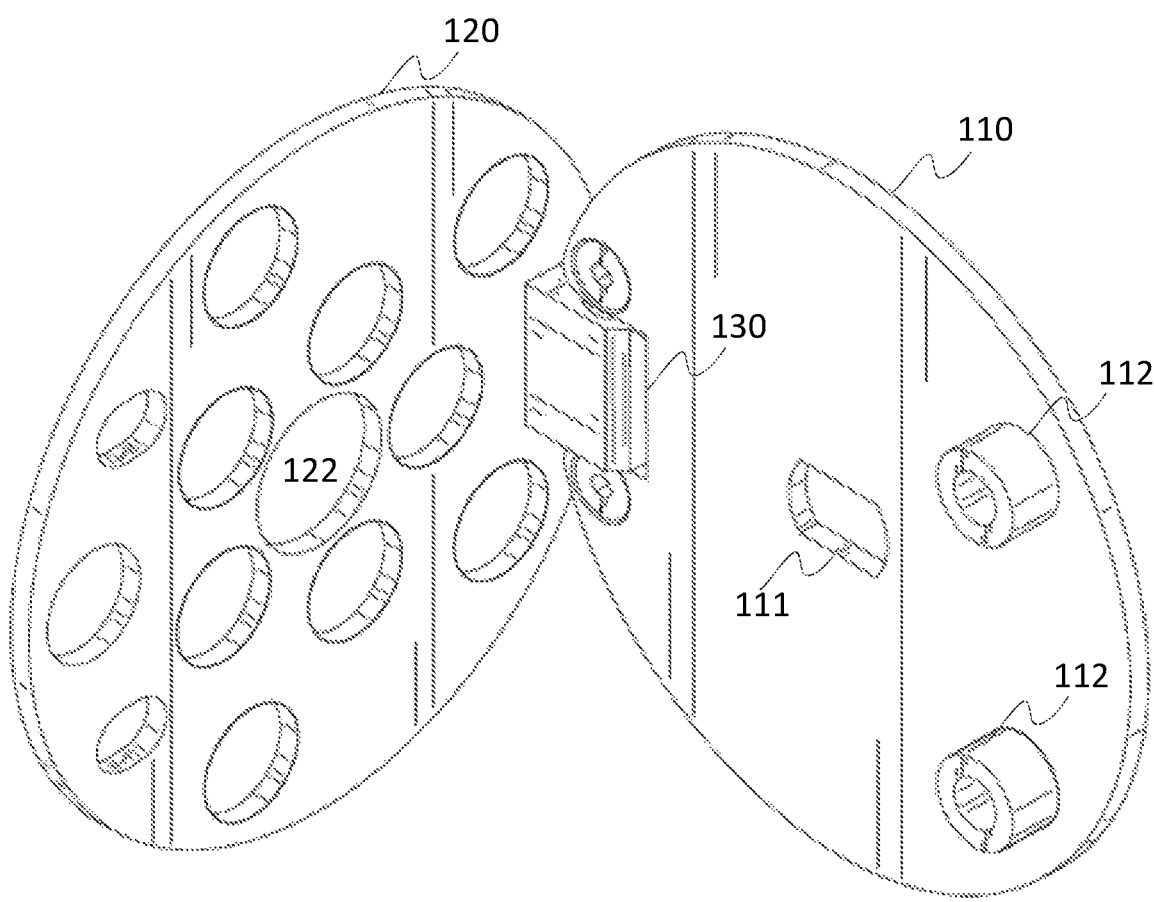
FIG. 8 is a contextual view of the hinged plate assembly according to the first example embodiment of the present invention.

FIG. 1 is a perspective view of a hinged plate assembly according to a first example embodiment of the present invention. FIG. 2 is a front elevation view of the hinged plate assembly according to the first example embodiment of the present invention. FIG. 3 is a rear elevation view of the hinged plate assembly according to the first example embodiment of the present invention. FIG. 4 is a left elevation view of the hinged plate assembly according to the first example embodiment of the present invention. FIG. 5 is a right elevation view of the hinged plate assembly according to the first example embodiment of the present invention. FIG. 6 is a top plan view of the hinged plate assembly according to the first example embodiment of the present invention. FIG. 7 is a bottom plan view of the hinged plate assembly according to the first example embodiment of the present invention. FIG. 8 is a contextual view of the hinged plate assembly according to the first example embodiment of the present invention.

Figure 9:
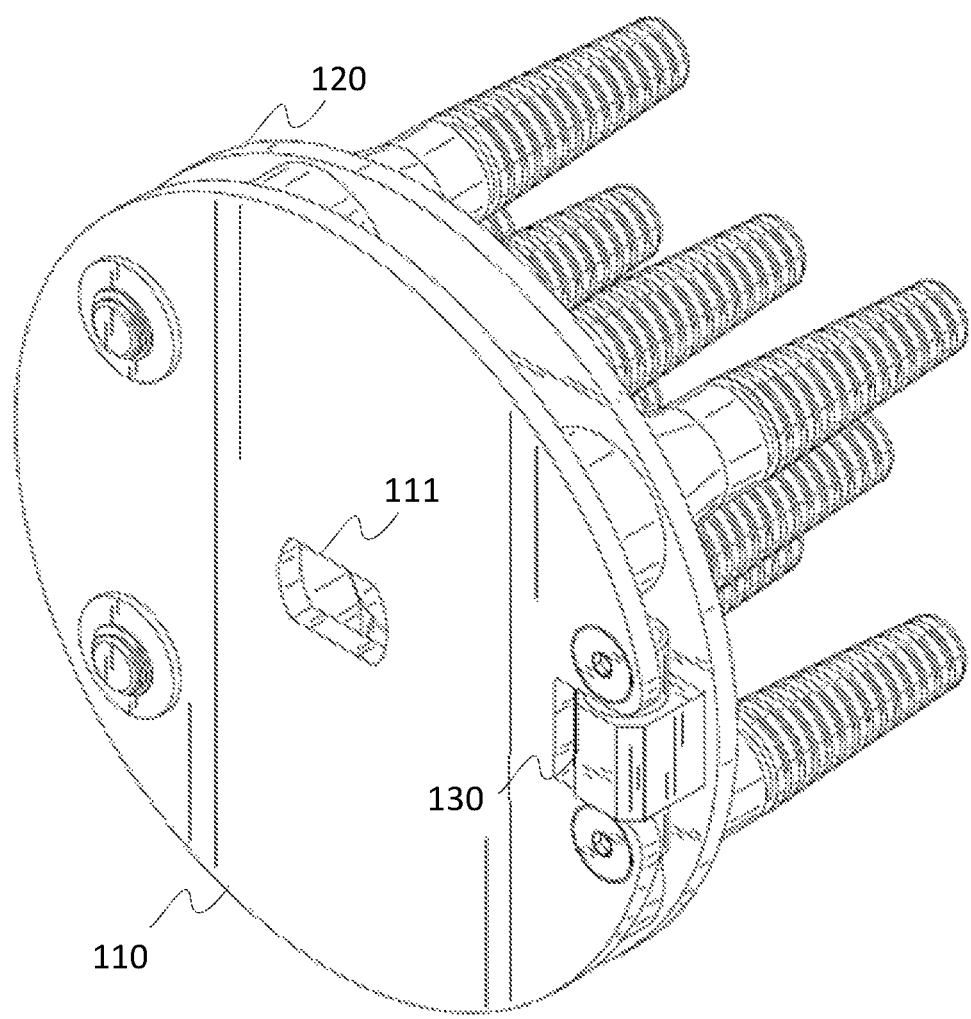
FIG. 9 is a perspective view of a hinged plate assembly according to a second example embodiment of the present invention.
Figure 10:
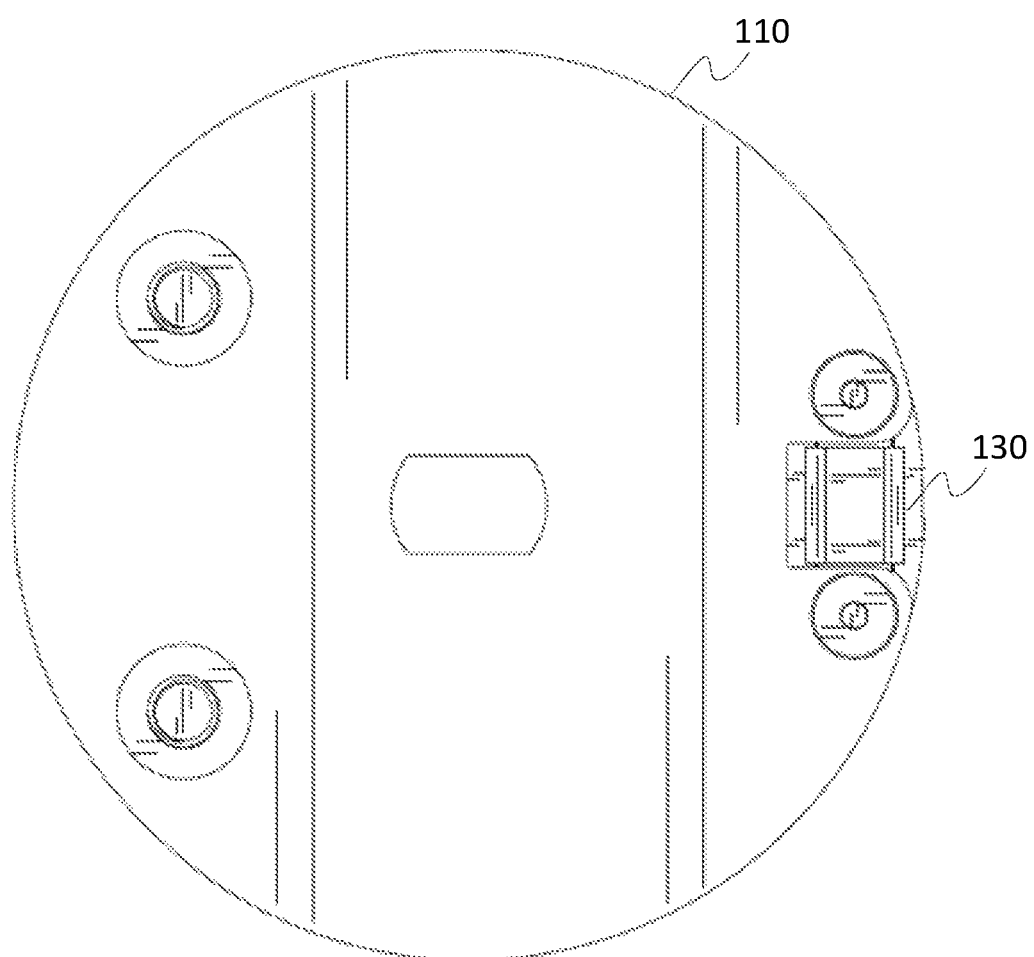
FIG. 10 is a rear elevation view of the hinged plate assembly according to the second example embodiment of the present invention.
Figure 11:
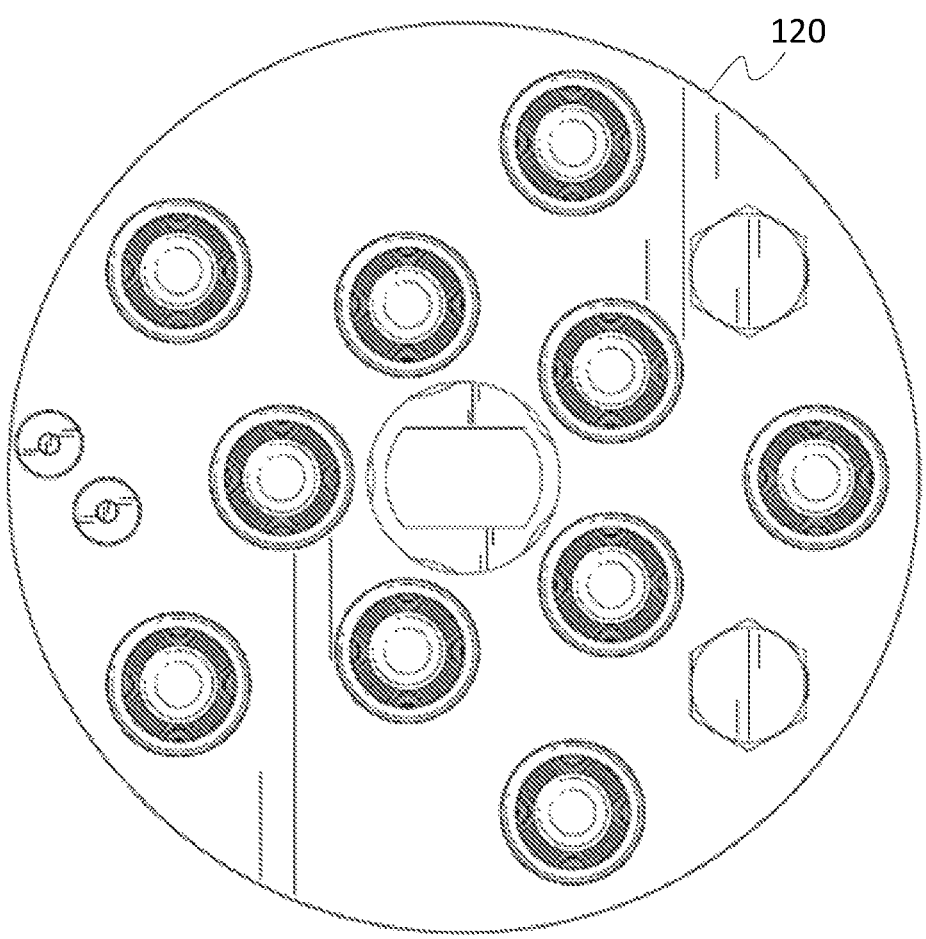
FIG. 11 is a front elevation view of the hinged plate assembly according to the second example embodiment of the present invention.
Figure 12:
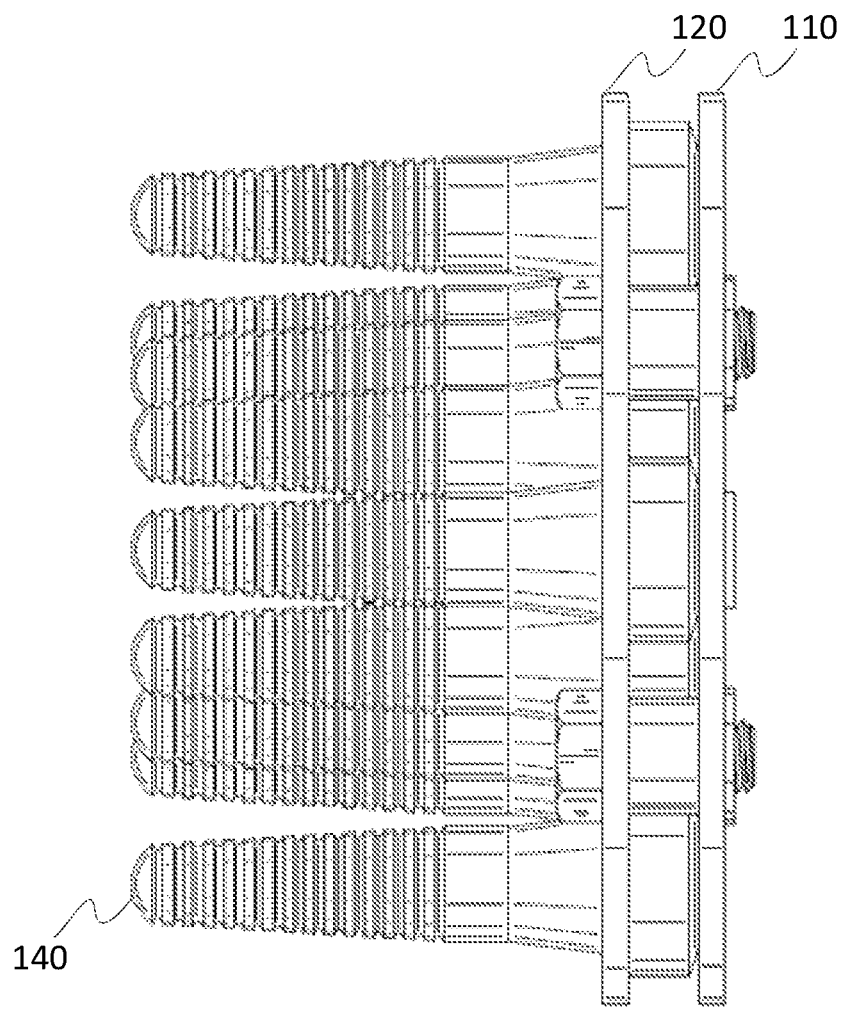
FIG. 12 is a left elevation view of the hinged plate assembly according to the second example embodiment of the present invention.
Figure 13:
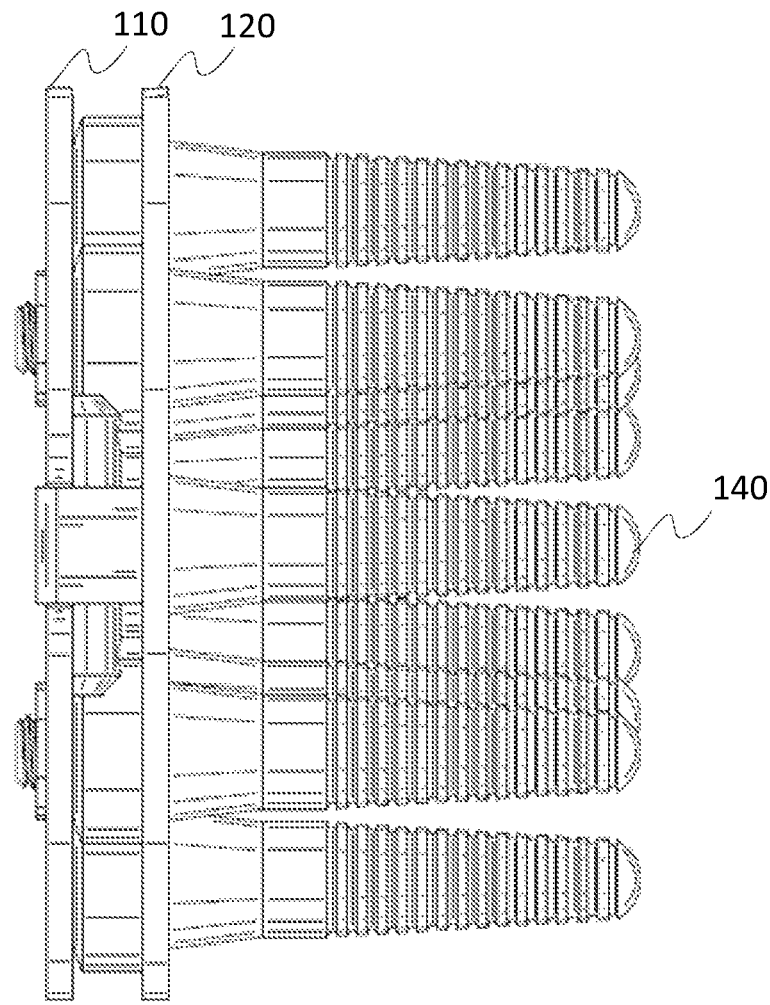
FIG. 13 is a right elevation view of the hinged plate assembly according to the second example embodiment of the present invention.
Figure 14:
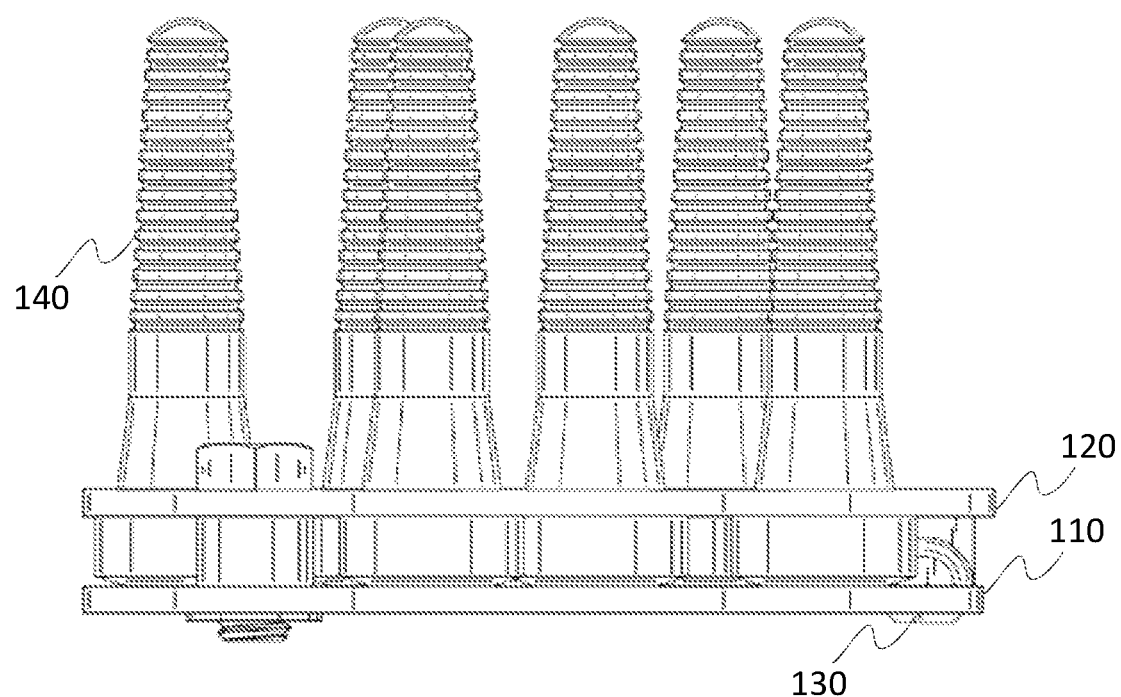
FIG. 14 is a top plan view of the hinged plate assembly according to the second example embodiment of the present invention.
Figure 15:
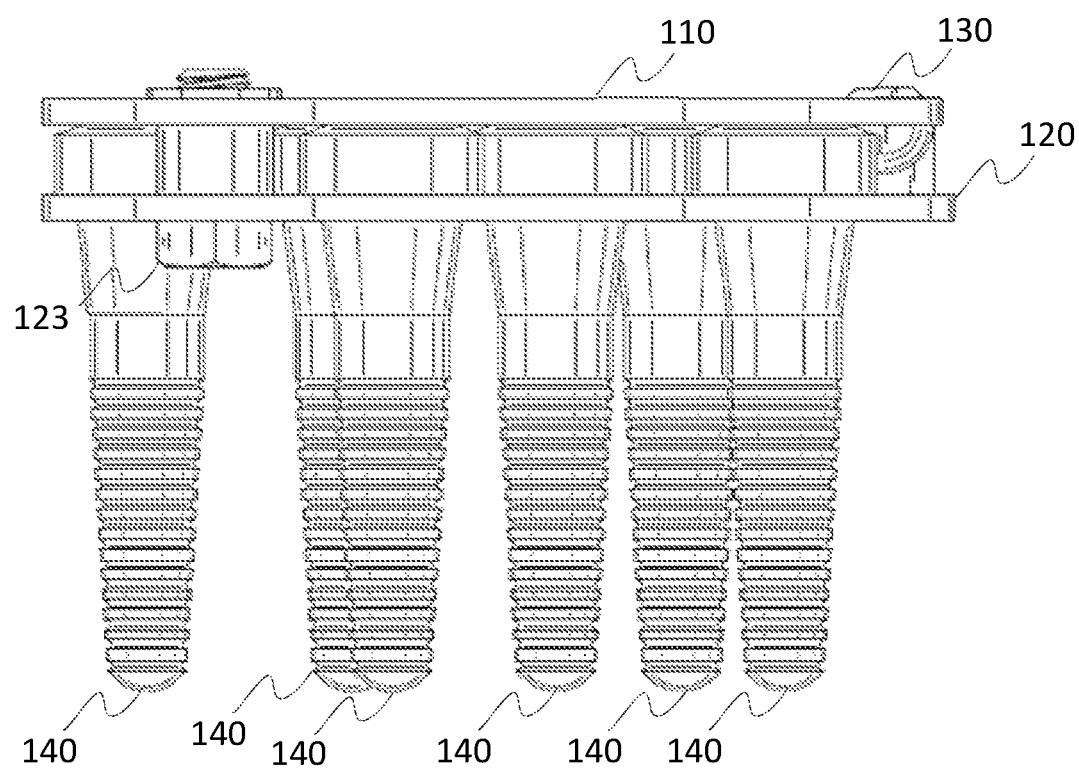
FIG. 15 is a bottom plan view of the hinged plate assembly according to the second example embodiment of the present invention.

FIG. 9 is a perspective view of a hinged plate assembly according to a second example embodiment of the present invention. FIG. 10 is a rear elevation view of the hinged plate assembly according to the second example embodiment of the present invention. FIG. 11 is a front elevation view of the hinged plate assembly according to the second example embodiment of the present invention. FIG. 12 is a left elevation view of the hinged plate assembly according to the second example embodiment of the present invention. FIG. 13 is a right elevation view of the hinged plate assembly according to the second example embodiment of the present invention. FIG. 14 is a top plan view of the hinged plate assembly according to the second example embodiment of the present invention. FIG. 15 is a bottom plan view of the hinged plate assembly according to the second example embodiment of the present invention. The embodiment illustrated in FIGS. 9-15 is the same as that shown in FIGS. 1-8 with the additional illustration of a plurality of fingers.

As illustrated in FIGS. 1-15, the various embodiments include a hinge plate assembly 100 that includes a first plate or base plate 110 and a second plate or finger plate 120 that are operatively and physically joined, connected, and/or coupled by hinge 130.

Base plate 110 includes a first opening or drive shaft opening 111 configured to physically join base plate 110 (and thus, hinge plate assembly 100) to a drive shaft (not shown) of a hub. Drive shaft opening 111 may take on a variety of shapes or structures to physically join base plate 110 with a variety of commercially available drive shafts. In some configurations, one or more adaptors may be used to physically join base plate 110 with a variety of commercially available drive shafts. For example, one end of an adaptor may be configured to physically join with the drive shaft, and another end of the adaptor may be configured to physically join with the drive shaft opening 111. In this way, the various embodiments are intended to be universally applicable and not limited to any particular drive shaft or hub. In particular, the embodiments may be configured to be physically joined onto any hub and/or any existing hub already in operation. Accordingly, existing hubs do not have to be replaced to use the hinge plate assembly 100.

The drive shaft does not protrude through base plate 110. If the drive shaft protruded through base plate 110, it would be impossible to securely bolt without additional components. In addition, if the drive shaft protruded through base plate 110, unacceptable movement of base plate 110 would result. Accordingly, the drive shaft does not extend to finger plate 120. Having a drive shaft that extends to finger plate 120 would interfere with the operation of hinge 130. In some configurations, an optional washer may be used when bolting base plate 110 to the drive shaft.

Finger plate 120 includes a plurality of second openings or finger openings 121. Each of finger openings 121 is configured to receive or to be coupled to a respective finger 140. Finger plate 120 includes a center opening 122 that enables access to drive shaft opening 111. For example, center opening 122 enables access to bolt/unbolt the drive shaft at drive shaft opening 111 while hinge plate assembly 100 is in a closed position.

Hinge plate assembly 100 includes hinge 130 to physically join, connect, and/or couple base plate 110 and finger plate 120. In addition, hinge 130 enables hinge plate assembly 100 to have open and closed positions. In an open position, one or more fingers 140 may be received and/or removed from finger plate 120. In a closed position, fingers 140 are secured (e.g., compressed) between base plate 110 and finger plate 120 of hinge plate assembly 100, as illustrated in FIGS. 9-15.

A first side of hinge 130 may be bolted, welded and/or tacked to base plate 110. A second side of hinge 130 may be bolted, welded and/or tacked to finger plate 120.

One or more standoff bushings 112 are disposed on base plate 110. Standoff bushings 112 determines a distance between base plate 110 and finger plate 120 when hinge 130 is in a closed position. The bushing height or distance between base plate 110 and finger plate 120 is determined to ensure that fingers 140 are secured (e.g., compressed) within hinge plate assembly 100, as illustrated in FIGS. 9-15.

The one or more standoff bushings 112 may be heavy pressed and/or welded to base plate 110. Each of standoff bushings 112 may be threaded and configured to receive bolt 123 through an optional washer (e.g., a thick washer having a thickness greater than 3 mm) and through finger plate 120. In the embodiments, finger plate 120 is not bolted directly to a drive shaft, but rather secured to base plate 110 by hinge 130 and a combination of respective bolts 123 that are received by respective standoff bushings 112. A variety of standoff bushings and bolt configurations may be utilized. The sizes and numbers may be varied. For example, an 8 mm bolt or 12 mm bolt may be used. In addition, two or more bolts may be used (e.g., a 3-bolt pie bolt pattern or a 5-bolt pattern.

The respective locations of hinge 130 and standoff bushings 112 are spaced so as to evenly apply pressure/compression to the respective bases of fingers 140. As a result, movement and wear of fingers 140 is reduced. Excessive movement and wear of fingers 140 is a known problem of current defeathering devices. A key aspect of the embodiments is use of standoff bushings 112 that are used to generate lockdown strength and stability. Known devices, such as Goodyear and Mattco, use a center bolt that goes into the main shaft of the hub such that pressure is not evenly applied to the fingers. In other words, known devices apply additional pressure near a center bolt.

Thus, according to the embodiments, a hinged plate device is provided using the standoff bushings as a tightening fixture and depth setting mark for the correct compression of the rubber finger bases.

The components of hinge plate assembly 100 may be comprised of a variety of materials such as stainless steel, mild steel, aluminum, metal alloys, durable plastics, combinations thereof, and the like. In the various configurations, the components are configured for durability. For example, base plate 110 and/or finger plate 120 may have a thickness of greater than 3 mm (preferably, a range between 3.4 mm to 4 mm).

The embodiments of the invention may use a variety of commercially available fingers. In this aspect, the embodiments are not limited to particular fingers of finger manufacturers. With the exception of size, fingers are generally interchangeable with one another.

List of components used herein: hinge plate assembly 100, base plate 110, drive shaft opening 111, standoff bushings 112, finger plate 120, finger openings 121, center opening 122, bolt 123, hinge 130, and fingers 140.

It will be apparent to those skilled in the art that various modifications and variations may be made in the hinged finger plate of the present invention without departing from the spirit or scope of the invention. Thus, it is intended that the present invention cover the modifications and variations of this invention provided they come within the scope of the appended claims and their equivalents.

What is claimed is:
1. A poultry defeathering device, comprising:
a first plate having a first opening configured to be coupled to a hub;

a second plate having a plurality of second openings, each of the second openings configured to be coupled to a respective finger; and a hinge connecting the first plate and the second plate, and at least one standoff bushing that determines a distance between the first plate and the second plate when the hinge is in a closed position.

2. The poultry defeathering device of claim 1, wherein a drive shaft does not protrude through the first plate.

3. The poultry defeathering device of claim 1, wherein the second plate includes a center opening to enable access to a drive shaft opening on the first plate.

4. The poultry defeathering device of claim 1, wherein the first plate is bolted to a drive shaft.

5. The poultry defeathering device of claim 1, wherein the poultry defeathering device has an open and closed position.

6. The poultry defeathering device of claim 5, wherein the one or more fingers can be received or removed in the open position.

7. The poultry defeathering device of claim 5, wherein the poultry defeathering device can be removed in the closed position.

8. The poultry defeathering device of claim 1, wherein standoff bushing height determines an amount of compression on respective finger bases.

9. The poultry defeathering device of claim 1, wherein locations of the hinge and standoff bushings evenly compress respective finger bases.

10. The poultry defeathering device of claim 1, wherein the poultry defeathering device comprises stainless steel.

11. The poultry defeathering device of claim 1, wherein a thickness of the first plate is greater than 3 mm.

12. The poultry defeathering device of claim 1, wherein a thickness of the second plate is greater than 3 mm.

13. The poultry defeathering device of claim 1, wherein the hinge is welded to the first plate and the second plate.

14. The poultry defeathering device of claim 1, wherein the hinge is welded and bolted to the first plate and the second plate.

15. The poultry defeathering device of claim 1, wherein the at least one standoff bushings are hard pressed to the first plate.

16. The poultry defeathering device of claim 1, wherein the at least one standoff bushing are hard pressed and welded to the first plate.

* * * * *